Fig. 24.

Patented Oct. 5, 1954

2,690,691

UNITED STATES PATENT OFFICE 2,690,691

SINGLE SPINDLE AUTOMATIC LATHE

Herbert H. Ranney, Windsor, Vt., assignor to Cone Automatic Machine Company Inc., Windsor, Vt., a corporation of Vermont Application September 15, 1949, Serial No. 115,804

7 Claims. (Cl. 82—2)

This invention relates to automatic lathes, and more particularly to such lathes each of which has a single hollow work spindle through which lengths of stock are fed, tools being positioned for operation on portions of the stock which project beyond the spindle.

One object of the invention is to provide tool slides for supporting tools for operating upon the stock and which tool slides are fed into the work by power, as under fluid pressure, the rate of feed being positively controlled mechanically.

A further object is to provide an improved end tool mechanism by which adjustment for straight or taper turning, or both, is made simple and accurate.

Still another object is to improve the stock stop mechanism by which accurate setting for stock length for each work piece is facilitated.

Still another object is to provide improved means for supplying and feeding stock to the spindle.

A further object is to provide for automatic stopping of the machine when the stock supply becomes exhausted.

Further objects and advantages will appear from a description of an embodiment of the invention shown in the accompanying drawings in which

Figure 12 is a detail sectional view on line 12—12 of Figure 1.

Figure 25 is a diagram showing the hydraulic system of the machine.

Referring first to Figures 1 to 4, at 1 is indicated a machine base having at its rear end an upwardly extending column 2 within which is journaled a hollow work spindle 4. This work spindle is provided with a work clamp such as the collet shown generally at 5 on Figure 2 at its forward end from which stock may extend, the extended portion being subjected to machining operations. The stock clamp 5 may be actuated by any suitable means but as herein shown it is actuated by axial motion of a spool 6 thereon which may pass more or less between clamp-actuating fingers 7 pivoted at 8 on a collar 9. Detailed showing of this stock clamp is not made herein since it is old and well known in the art and any desired clamping means such as is well known in the art may be employed.

The work spindle 4 is rotated, and for this purpose it is shown as provided with a gear 10 with which meshes a gear 11 carried by a jack shaft 12. Fixed to rotate with the gear 11 is a long gear 13 with which meshes a gear 14 splined to a shaft 150. This gear 14 is movable axially of its shaft while holding in mesh with the long gear 13, so that this gear 14 may mesh with a relatively small drive gear 15 or a smaller gear 16 axially movable therewith may mesh with a gear 17, or a still smaller gear 18 may mesh with a gear 19, the gears 15, 17 and 19 being carried on a drive shaft 20. The gears 14, 16 and 18 are carried by a quill 21 slidable on the shaft 150 and such sliding may be accomplished by the rotation of a shaft 22 (see Figure 20) which has a pinion 23 thereon meshing with a rack portion of a bar 24. The bar 24 carries a yoke 25 which engages in a peripheral groove 26 in the quill 21. The shaft 22 extends out through the casing of the machine and is provided with a handle 27 by which it may be turned, thus to determine which of the three sets of gears will be operative to drive the spindle from the drive shaft 20. The handle 27 may be latched in any of the three selected positions. The drive shaft 20 also extends outwardly from the machine casing and has a splined portion 30 for the reception of a belt pulley 31 over which may pass a V belt which passes about a drive pulley 32 on the main driving motor M.

The shaft 20 has journaled thereon a bevel gear 35 which may be clutched thereto by the closing of a clutch at 36 which may be accomplished by the axial motion of a clutch collar 37 shifted by a yoke 38 engaging this collar and being carried by a sleeve 39 guided for sliding motion on a stationary guide bar 40. A link 41 connected to the slide 38 at one end is pivoted at 42 to a crank arm 43. The yoke is carried by an actuating shaft 44 which extends outwardly of the machine frame and carries an actuating handle 45 on one of its outer ends (see Figure 4) and with a second actuating handle 46 on the opposite face of the machine from the handle 45. It also carries an arm 47 having a follower roll 48 actuated by cams (not shown) on a cam drum 49 on a horizontal cam shaft 58.

The spool 6 which is moved axially to clamp or release the stock may be moved axially by the swinging of a lever 50 (see Figure 1), fingers 53 at its lower end engaging in the groove 54 of the clamp-controlling spool. The upper end of the lever 50 is provided with a follower 56, positioned to be moved at suitable times by cams (not shown) on a drum 57 carried by the cam shaft. This cam shaft 58 is arranged substantially parallel to the spindle 4 and is positioned above this spindle.

Figure 8:
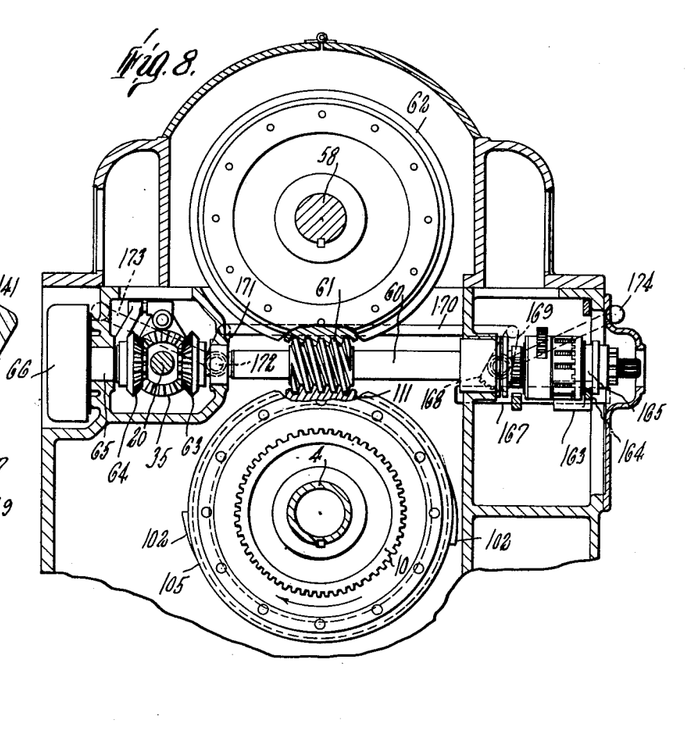
Figures 8 and 9 are detail sectional views on lines 8—8 and 9—9, respectively, of Figure 1.

The shaft 58 is driven at high and low speeds by a cross worm shaft 60 as shown best in Figure 8, this shaft 60 having a worm 61 thereon which meshes with a worm wheel 62 fixed to the cam shaft 58. It receives its fast driving motion from the bevel gear 35 on the shaft 20 which meshes with a similar bevel gear 63 carried by this worm shaft. In opposed relation to the bevel gear 63 is a second similar gear 64 carried on a short shaft 65 provided at its outer end with a suitable brake indicated at 66. This brake may be an electrically operated brake which is energized for a short period whenever the high speed clutch 36 is opened to slow the speed of rotation of the worm shaft 60 to its low speed drive. Whenever the clutch 36 is closed the worm shaft 60 is in high speed drive position which is during the time that the work is not being machined, and when further operations, such as stock feeding and movement of the tool slides in retraction, or in moving up toward the work to the start of slow feed position, are taking place.

The slow feed drive, which is in force while the tooling operations are being performed on the work, is derived from the work spindle through mechanism at the opposite end of the shaft 60 as will later appear.

Side working tools

Figure 17:
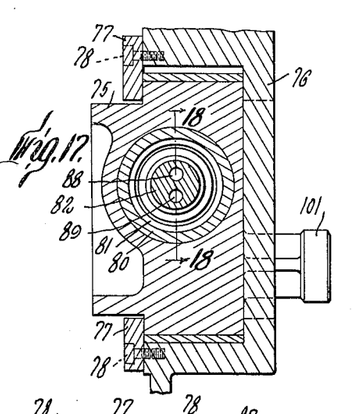
Figure 17 is a detail sectional view on line 17—17 of Figure 16.
Figure 18:
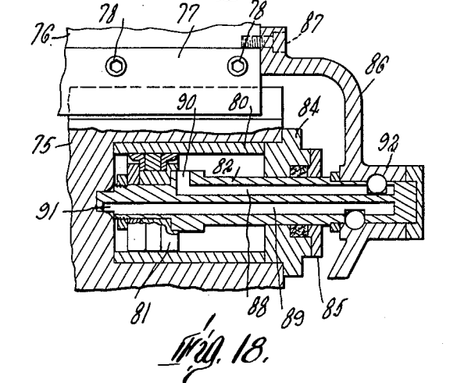
Figure 18 is a detail sectional view on line 18—18 of Figure 17.

As shown herein, three tool carriers 70, 71 and 72 (see Figure 16) have been provided, these being arranged at different angular positions around the axis of the spindle. Each of these tool carriers, as shown best in Figures 17 and 18, comprises a slide 75 mounted in a guideway 76 in the machine bed and retained in position in the guideway as by retaining plates 77 which may be secured in position as by screws 78. Each of these slides 75 is provided with a cylindrical chamber for the reception of a fluid pressure cylinder 80 (see Figure 18) within which is slidably mounted a piston 81 carried by a piston rod 82. This piston rod extends through a cylinder head 84 provided with a suitable packing gland 85, and the outer end of the piston rod is secured in a bracket 86 secured to the machine frame as by screws 87. The piston and piston rod are held stationary by the bracket 86, but the cylinder 80 being carried by the tool carrier slide is movable therewith. The piston rod 82 has a pair of fluid pressure passages 88 and 89 therethrough, the passage 88 opening out within the cylinder 80 on the piston head side through the port 90, while the passage 89 opens into the cylinder 80 at the opposite face of the piston as at 91. Within a head 92 of the bracket 86 and in communication with the passages 88 and 89 are fluid pressure pipes through which fluid under pressure may be delivered to or discharged from opposite ends of the cylinder thus to drive the tool carrier toward or away from the work spindle.

Each of the slides carries a short shaft 100 on which is journaled a cam follower roll 101 and each of these cam follower rolls is adapted to be moved into or out of engagement with a corresponding cam 102 adjustably carried on a cam ring 105 journaled on a pair of supporting rings 106 carried by the spindle 4 and suitably clamped thereon. The cam ring 105 has attached thereto, as by screws 110, a worm gear ring 111 with which meshes the worm 61 of the cross shaft 60, so that the cam ring 105 is rotated thereby concentric with the work spindle but at a slower rate, this rate being determined by the rate of rotation of the worm shaft 60. These parts are so arranged and their motions are so timed that the tool carrier slides are moved inwardly when the high portions of the cams 102 are in position to be contacted by the follower rolls 101, and during the slower working speed rotation of the shaft 60 the engagement of the cam followers 101 on the cams 102 and the movement of these cams 102 in clockwise direction, as viewed in Figure 16, determine the rate at which the carriers approach the work. Thus the feed of the tools relative to the work during their operative or cutting action is effected by power produced by the fluid pressure mechanism, but the rate of such feed is controlled mechanically by the cams 102 and their slopes and rates of motion.

Slow feed

The slow feed rotation of the shaft 60, as before noted, is produced by driving mechanism at the opposite end from the high speed drive derived from the shaft 20, and as shown herein this slow speed drive is accomplished at a variable rate so that the chips cut by the tools are of irregular thickness which results in breakage of the chips so that they do not come off in long continuous lengths which are troublesome to handle in the machine.

Figures 9, 10:
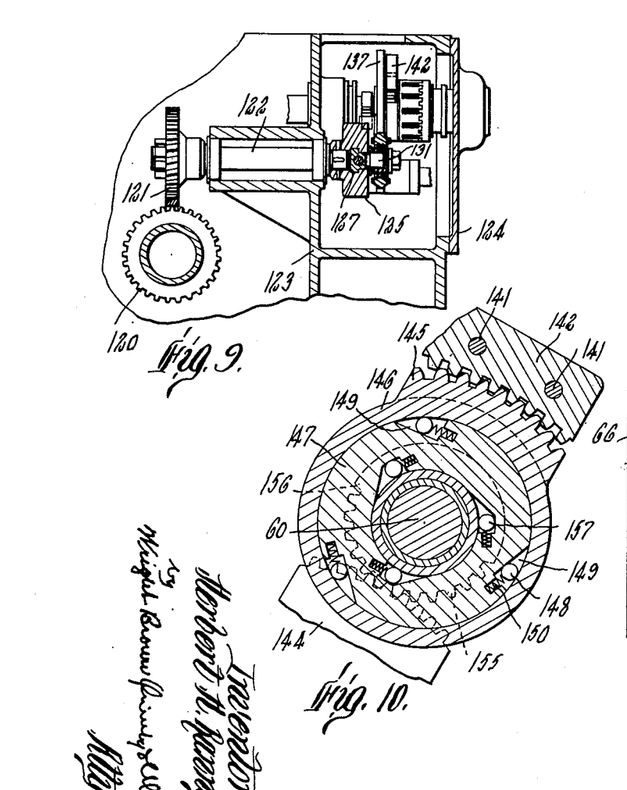
Figure 10 is a sectional view to a larger scale on line 10—10 of Figures 7 and 8.
Figures 19, 20:
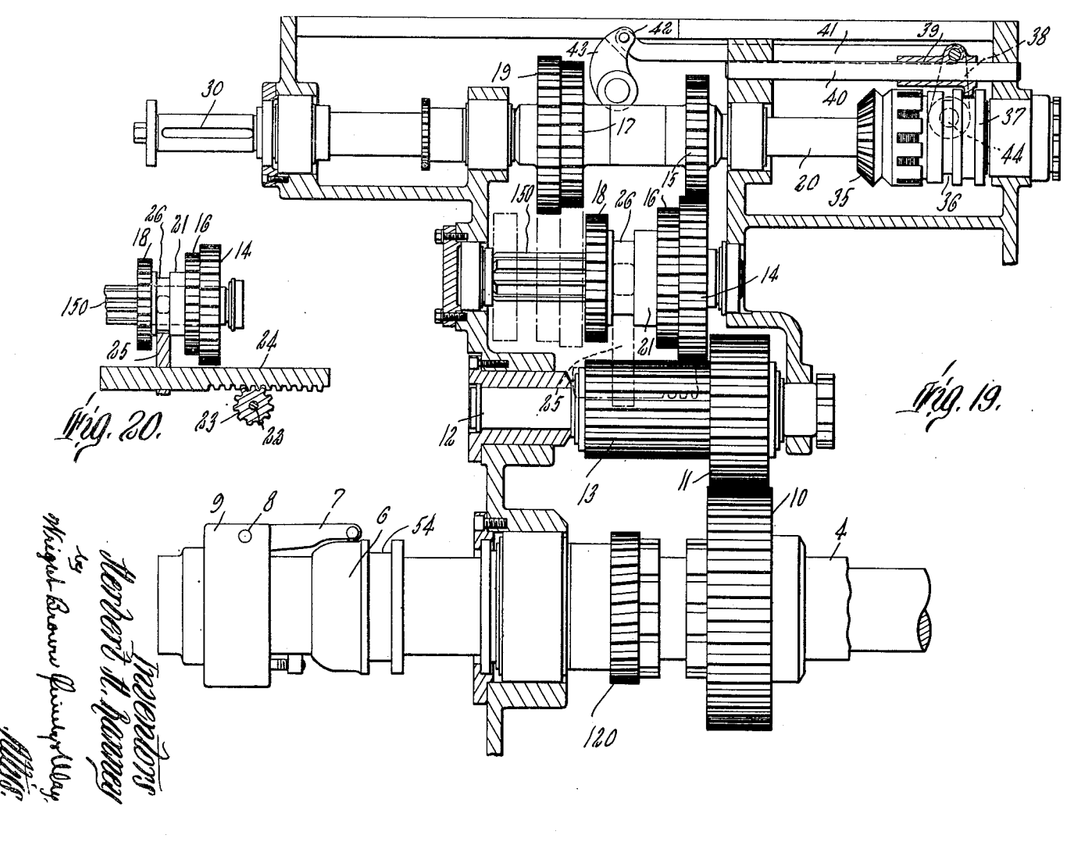
Figure 19 is a development of the work spindle driving mechanism.
Figure 20 is a detail sectional view to a larger scale on line 20—20 of Figure 3.
Figure 21:
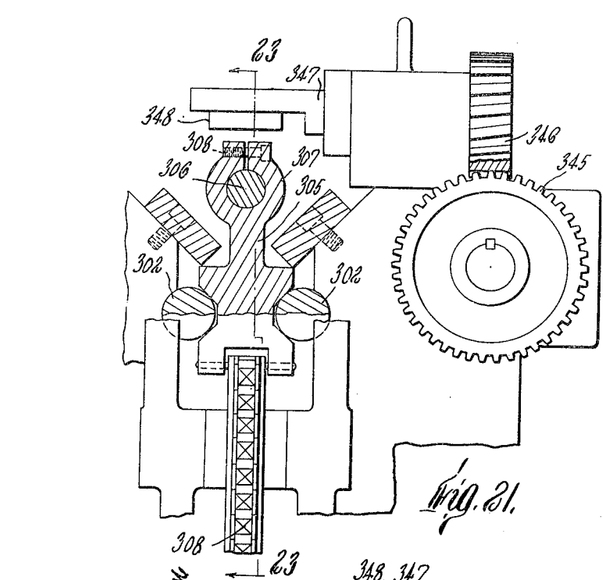
Figures 21 and 22 are detail sectional views on lines 21—21 and 22—22, respectively, of Figure 1.

The mechanism for producing the slow feed rotation of the worm shaft 60 is shown best in Figures 6, 7, 9 and 10 and its drive mechanism is shown best in Figures 9 and 19. Referring to Figure 19, the spindle 4 is provided with a helical gear 120 with which meshes a similar gear 121 (see Figure 9) carried by a shaft 122. This shaft 122 extends into a casing 123 normally closed by a cover plate 124. Within this casing 123 there is fixed to the shaft 122 a disk 125 having a slideway 126 arranged diametrically thereacross (see also Figure 6). Within this slideway is mounted a block 127 which is adjustable toward and from the axial center of the disk by the turning of a threaded shaft 128 journaled at 129 in a rim portion 130 of the disk 125. This slide 127 has a journal member 131 extending therefrom which can be adjusted by adjusting this block so that it is eccentric to the axis of the shaft 122 to any desired extent. Journaled on this journal member 131 is a second block 135 slidable between parallel guides 136 in a bell crank lever 137 which is fulcrumed at 138 on a fixed pivot. As the shaft 122 rotates, therefore, the rocking motion is produced by the bell crank lever 137, the amplitude of which is dependent upon the amount of eccentricity of the journal 131 with respect to the shaft 122. This rocking motion is made to produce a periodic turning of the worm shaft 60 whenever this worm shaft is not driven at its fast speed through the fast speed drive mechanism hereinbefore described. The opposite arm 140 of the bell crank lever 137 is forked, one branch having fixed thereto, as by screws 141, an arcuate segment 142 of an internal gear, and the other branch of the fork 143 carrying a segment 144 of an external gear. The segment 142 meshes with a segment 145 of an external gear projecting outwardly from a ring 146 (see Figure 7) which is journaled on a hub portion 147 (see Figure 10) with the outer face of which it is connected by a one-direction clutch mechanism comprising three rollers 148 seated in tapering depressions 149 in the hub 147 and urged into clutching engagement by springs 150. This arrangement is such, as may be seen by an inspection of Figure 10, that when the ring 145 is rotated in clockwise direction it is clutched to the hub 147 which is thus rotated in the same direction, but during the reverse direction of turning of the ring 146 it is freed from clutching engagement with the hub 147 which does not turn in this direction therewith.

The segment 144 which meshes with a segmental portion 155 of a sleeve 156 is effective upon the rocking of the shaft 122 to turn this sleeve 156 through a small angle in opposite directions. When the sleeve 156 is turned in a clockwise direction, it is clutched by the roller clutch elements 157 to the inside face of the hub portion 147, while when it is rocked counterclockwise it is unclutched therefrom. Bushings 162 may be interposed between the ring 160 and the hub portion 147 and between the hub portion 147 and the sleeve 156. Thus the hub portion 147 is rotated step by step in clockwise direction, as viewed in Figure 10, and it has a ring portion 160 adapted to be clutched to the worm shaft 60 by the closing of the clutch 161.

The clutch 161 is actuated by the shifting of a member 163 having a yoke 164 engaging in a groove 165 in the clutch spool 166. The member 163 is carried by an axially movable rod 167 provided with a rack portion engaged by a gear segment 168. The gear segment 168 forms a portion of a lever 169 which is connected through a link 170 with an arm 171 (see Figure 8) carried by a rock shaft 172. This rock shaft extends out through the machine casing where it is provided with a handle 173. The shaft 172 which carries the arm 171 is also provided with an actuating handle 174. During normal operation the low speed clutch 161 remains closed. When the high speed clutch is closed, the low speed clutch, including the two one-way roller clutches previously described, acts as an overrunning clutch which allows the high speed drive to take over the control and drive the worm shaft 60. When the high speed clutch is open, the drive is taken over by the low speed clutch. When setting up, however, it is often desirable to open the low speed clutch 161.

Figure 5:
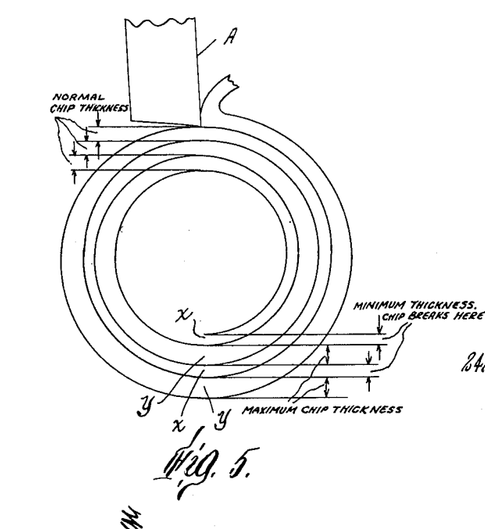
Figure 5 is a diagrammatic view of a tool feed which results in breaking of the chips.
Figure 6:
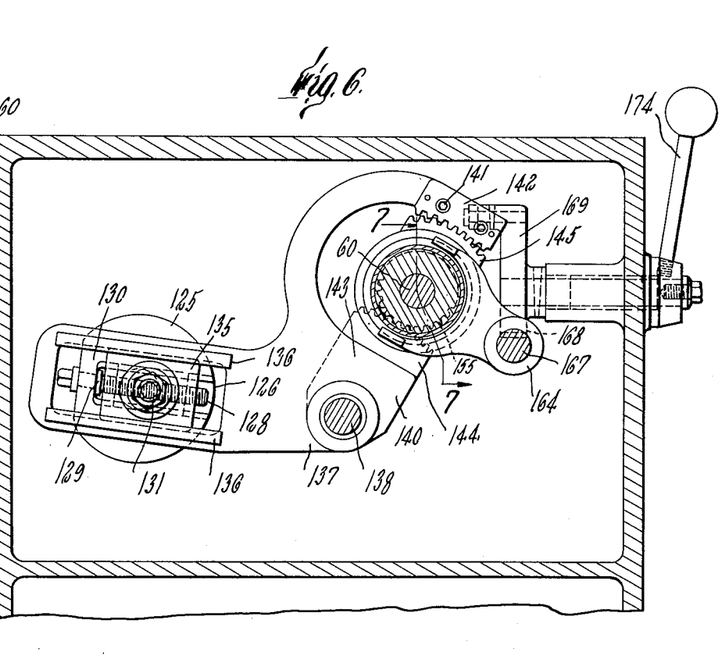
Figure 6 is a detail sectional view on line 6—6 of Figure 2.
Figure 7:
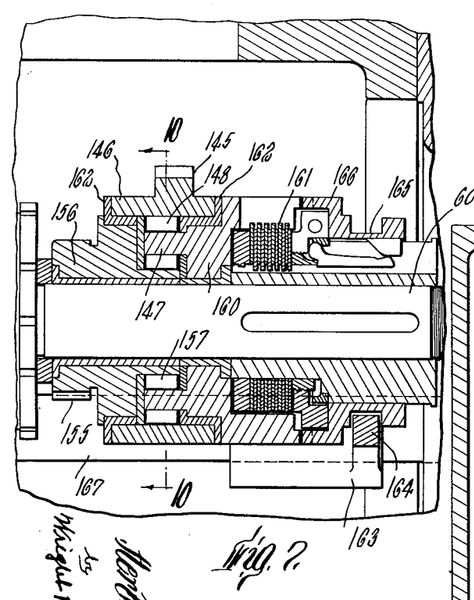
Figure 7 is a detail sectional view on line 7—7 of Figure 6.

The effect of the intermittent drive of the low speed clutch on the chip produced by a turning tool is illustrated in Figure 5. The turning tool A is caused to be fed at varying rates as the cam ring 105 is driven at a variable rate of speed and with a controlling cam 102 having a gradual uninterrupted slope. The effect, as shown in Figure 5, is to produce a chip having alternate relatively thin portions as at $x$ and relatively thick portions as shown at $y$, with intermediate portions of intermediate thickness. This results in the chip being of vardying strength, the chip breaking at the thinner portions and thus coming off from the work in disconnected short lengths. The particular mechanism by which this chip breaking is effected is not a portion of the present invention but forms subject matter of an application for patent of Roger W. Brown, Serial No. 118,083, filed September 27, 1949.

The final limits of feed are determined by positive stops 180 on the tool slides striking fixed frame portions and independent of the cams 102, so that true final diameters are assured.

End working tools and mounting

Extending parallel to the axis of the work spindle and forwardly from the column 2 are a pair of spaced guide bars 200 which are supported at their outer ends in a downwardly extending bracket 201 carried by an upper frame member 202 which extends forwardly beyond the forward end of the work spindle. The rear ends of the bars 200 extend into the column 2 where they are rigidly supported. Slidably carried by these bars 200 is a main tool slide 203. In its upper portion the slide 203 is provided with a cylindrical chamber 204 within which is positioned a hydraulic cylinder 205. This cylinder contains a piston 206 shown in dotted lines in Figure 11 and its piston rod 207 extends out through a suitable head which may be similar to that shown in Figure 18 for the side working tools, and is fixed in the top frame member 202. The piston rod contains suitable fluid pressure passages similar to that shown in Figure 18 whereby pressure may be introduced into the pressure chamber on either selected side of the piston 206 thereby to move the main tool slide 203 lengthwise of the guide bars 200 and thus in predetermined angular relation to and, as shown, in parallel relation to the work spindle. The lower face of the tool slide 203 is provided with T-slots 210 to facilitate attachment thereto of a suitable tool holder. The tools carried by this holder are thus given a motion parallel to the work axis as the main tool slide 203 is moved along the guide bars 200.

Figures 11, 13, 14, 15, 16:
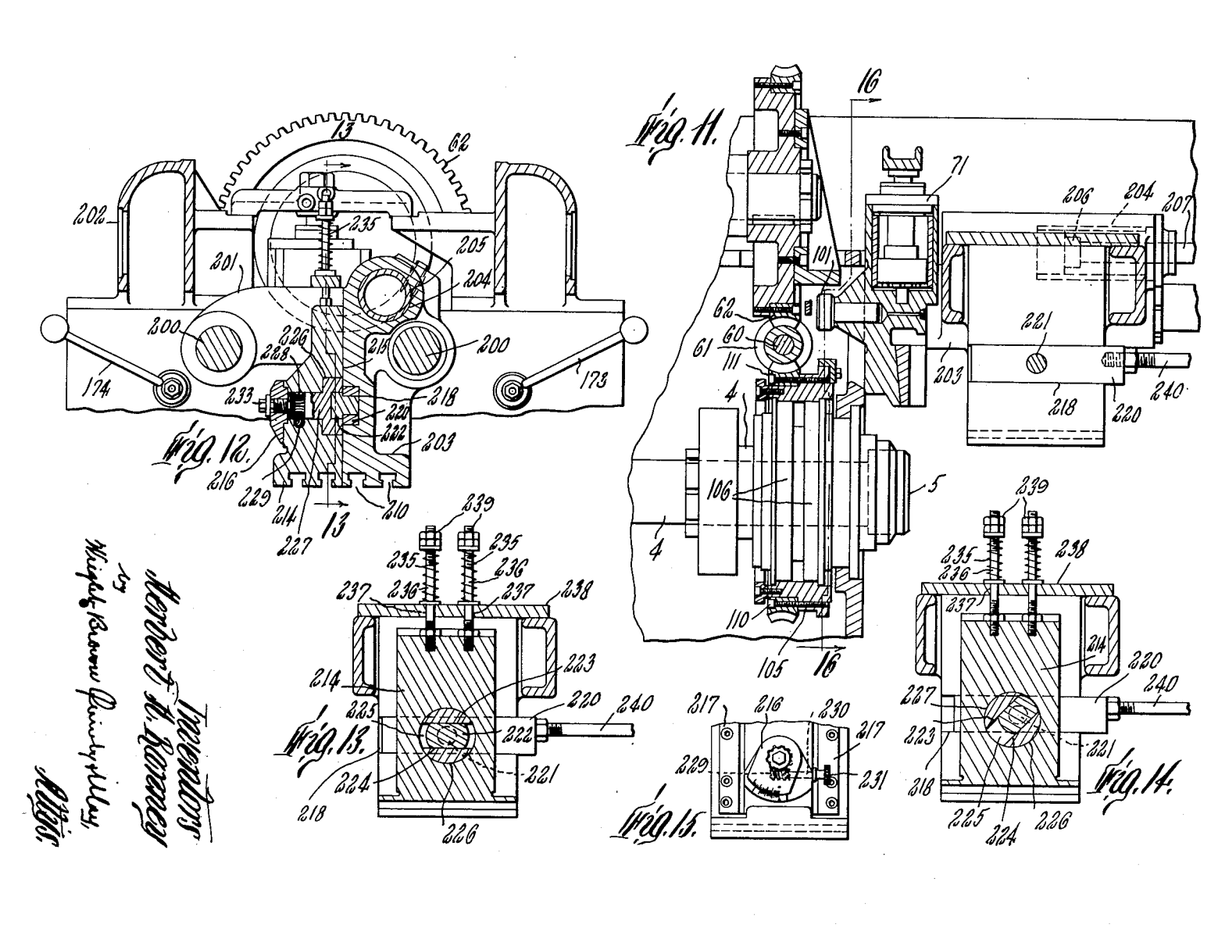
Figure 11 is a detail sectional view on line 11—11 of Figure 2.
Figure 13 is a detail sectional view on line 13—13 of Figure 12.
Figure 14 is a view similar to Figure 13 but showing parts in different positions of adjustment.
Figure 15 is a fragmentary elevation to a larger scale of parts shown in Figure 1.
Figure 16 is a detail sectional view on line 16—16 of Figure 11.
Figure 16:
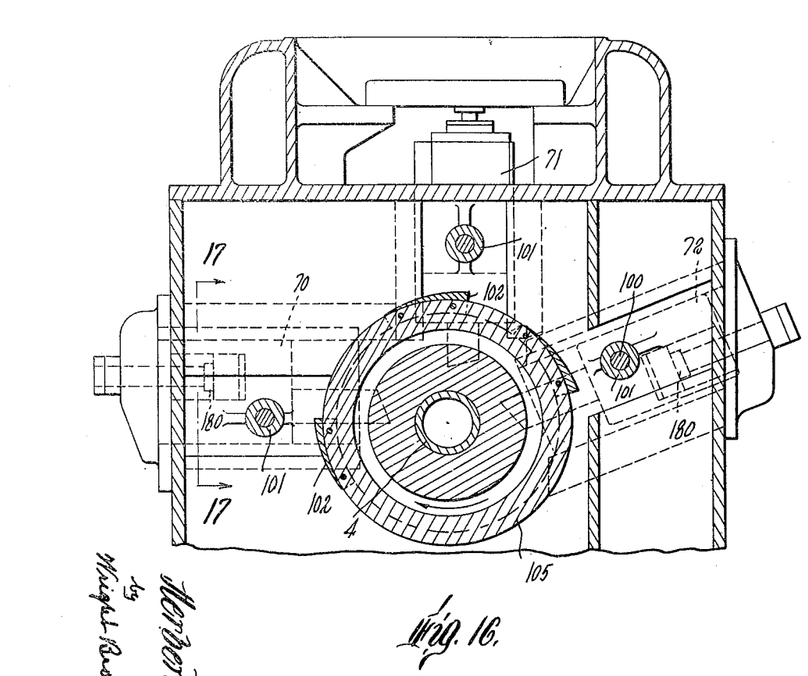

This main tool slide 203 carries a secondary tool slide 214. This slide 214, as shown best in Figures 12, 13 and 14, is formed with T slots for the attachment of tool holders similar to the T slots 210 of the main slide 203 arranged to slide up and down across the vertical face 215 of the main tool slide 203 and it is held thereagainst as by a dial member 216 which bears against the outer face of the secondary tool slide as shown in Figure 12. It is slidably guided for motion transverse to the bars 200 as between the side guide members 217 shown best in Figure 1. The face portion 215 of the main tool slide is formed with a longitudinal way 218 therein within which is slidably guided a bar 220 (see particularly Figures 11, 12, 13 and 14). This bar 220 has journaled therein a pivot portion 221 of a block 222. The block 222 has parallel side portions 223 and 224 which are slidably guided in a diametrical slot 225 in a disk 226 which is journaled in a circular recess in the inner face of the secondary slide 214 (see particularly Figure 12). This disk 226 is provided with a coaxial pivot portion 227 which has a worm gear portion 228 thereon with which meshes a worm 229 on a worm shaft 230 having an adjusting knob 231 on its outer end. A set screw 233 passes through the dial member 216 and threads into the outer end of the pivot portion 227 to lock it against accidental turning. The bar 220 has attached thereto the inner end of a rod 240 threaded for the major portion of its length and extending through a hole in the bracket 201, outwardly of which it has threaded thereon a pair of check nuts 242. Between the bracket 201 and the end of the bar 220 there is a similar pair of check nuts 243 threaded thereon. These pairs of check nuts act as stops to limit the sliding motion of the rod 240 through the bracket 201. Thus as the main tool slide is moved inwardly, carrying the secondary tool slide with it, the bar 220 is moved with both until the check nuts 242 impinge on the outer face of the bracket 201. Further motion of the bar 220 with the main and secondary tool slides is then stopped and such motion causes sliding of the block 222 within the guideway 224. If this guidaway is positioned parallel to the motion of the main tool slide in the position shown in Figure 13, the secondary tool slide continues on its parallel motion, but should the guide 224 be turned at an angle to the direction of motion of the main tool slide, the secondary tool slide is given a motion transverse thereto, depending upon the extent of such angular adjustment. Such position is shown, for example, in Figure 14 wherein the secondary tool slide, after the motion of the bar 220 has been stopped, is given a downward motion as far as is permitted by the block 222 engaging the wall of the journal opening 227. This results in the secondary tool slide being given a motion, which, when imparted to a tool carried thereby, produces a taper cut on the work depending in amount of the taper on the angular adjustment of the disk 226. Return motion of the main slide moves the secondary slide with it until the motion of the bar 220 is stopped by the check nuts 243 striking the bracket 201, whereupon further motion of the main slide returns the secondary slide to starting vertical position. It is thus possible with this mechanism to cut either straight or taper, and if desired, both at the same time. For example, the outside diameter of a tubular work piece may be cut straight and the inside diameter tapered.

In order to provide against any lost motion in these parts, the secondary tool slide is pulled upwardly sufficiently to take up such lost motion, as by a pair of springs 235 surrounding posts 236 secured at their lower ends in the secondary tool slide, and projecting through openings 237 in a top cover plate 238 extending across the top face of the main tool slide. These springs 235 bear between washers engaging the top face of the plate 238 and washers held by check nuts 239 threaded on the upper ends of the rods 236.

It will be noted that the secondary tool slide partakes of the parallel motion of the main tool slide during the high speed movement of the tool slides required to bring the tools up close to the work and during final retraction, but that when the tools are actually operating upon the work, the bar 220 may have reached its limit of motion with the main tool slide so that during the cutting action of the tool or tools carried by the secondary tool slide the angular adjustment of the disk 226 controls the extent of taper.

*Stock feeding and control mechanism*

Figures 1, 1A:
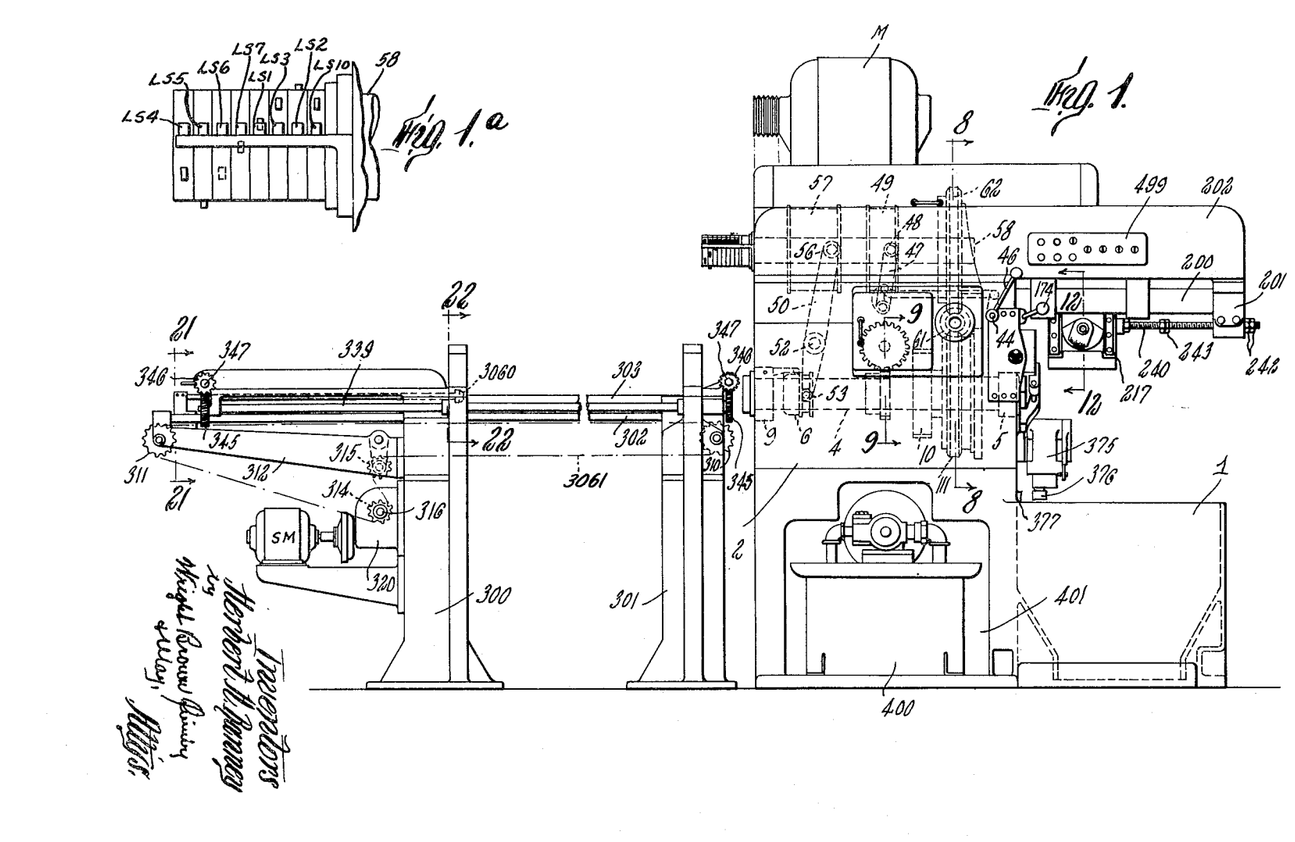
Figures 1, 2 and 3 are front, right hand and left hand end elevational views of a machine embodying the invention.
Figure 1a is a fragmentary side elevation to a larger scale of parts shown in Figure 1.
Figure 2:
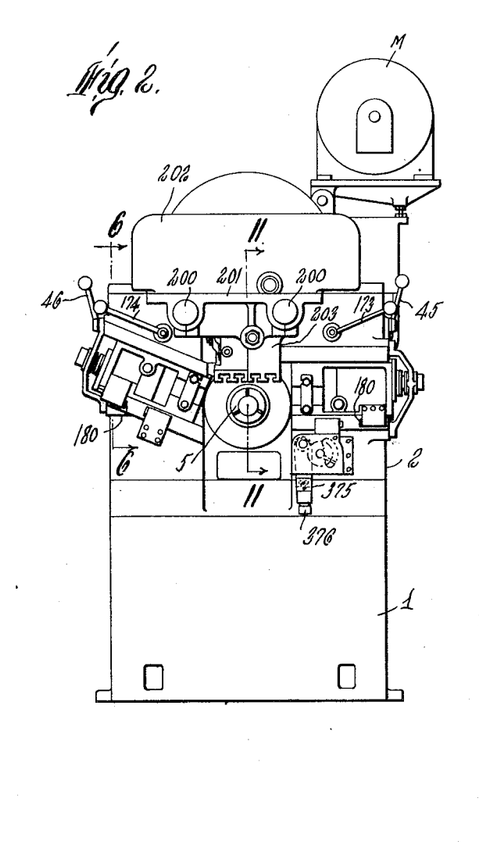
Figure 3:
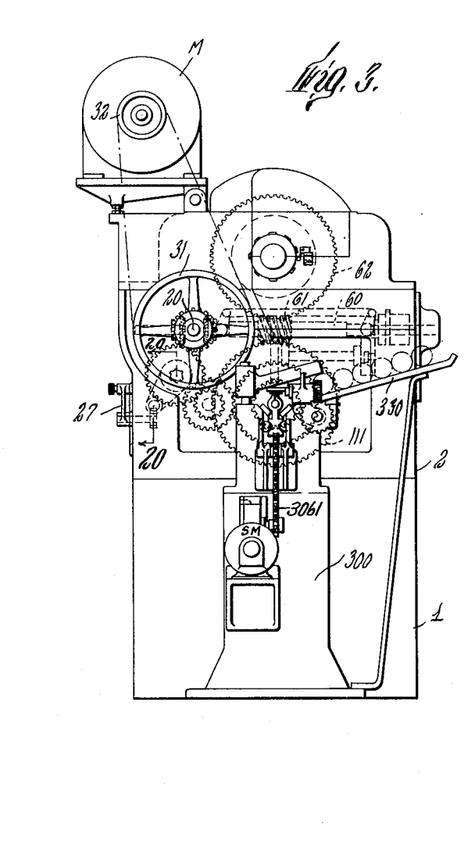
Figure 23:
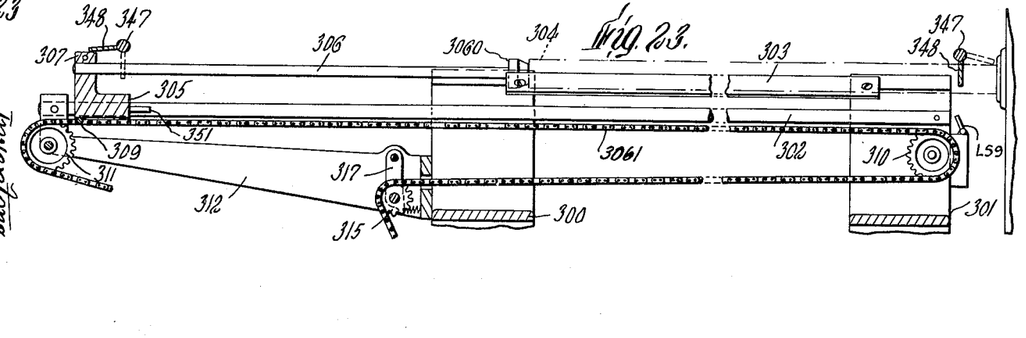
Figure 23 is a detail sectional view on line 23—23 of Figure 21.

Positioned at the back part of the machine are a pair of spaced stands 300 and 301, which are connected at their upper ends by a pair of spaced guide bars 302 and above them a pair of downwardly and inwardly inclined trough members 303. These trough members are so positioned as to support a piece of stock 304 in substantially axial alignment with the hollow of the work spindle. Slidably guided on the guide bars 302 is a feed carriage 305 supporting a feed rod 306. This rod 306 at its inner end supports a rotating plunger head 3060 and may engage in a split bearing 307 in the carriage 305 which may be clamped into engagement with the bar 306 by tightening a screw 308. The plunger head 3060 may engage the rear end of the piece of stock 304 and by moving the head 3060 forwardly, or to the right, as shown in Figures 1 and 23, the piece of stock may be fed into the spindle and through it at suitable times as far as permitted by a stock stop which will later be more fully described.

The feeding and retracting motions of the plunger 3060 may be produced by suitable driving mechanism, herein shown as comprising an endless chain 3061 secured at 309 to the feed carriage 305 and arranged to pass around end sprocket wheels 310 and 311. The sprocket wheel 310 is journaled on the inner stand 301 and the outer sprocket wheel 311 is journaled on the rear end of a bracket arm 312 extending rearwardly from the stand 300. From the sprocket wheel 311 the chain 3061 travels downwardly and forwardly around a driving sprocket wheel 314, then upwardly around a guide and tensioning sprocket wheel 315 journaled on a spring pressed arm 317 pivoted on the bracket arm 312, and then substantially horizontally to the sprocket wheel 310. The driving sprocket 314 is carried by a shaft 316 which is connected through a reduction gearing and slip clutch shown generally at 320 to a reversible motor SM. By reversing this motor at suitable times, the direction of travel of the stock pusher plunger 3060 may be changed, thus to cause a piece of stock to be fed into the spindle from time to time as desired, the feeding carriage being then retracted to permit a new piece of stock to come into place forwardly of the plunger 3060 so that this stock piece may be thereafter fed into position.

Figure 22:
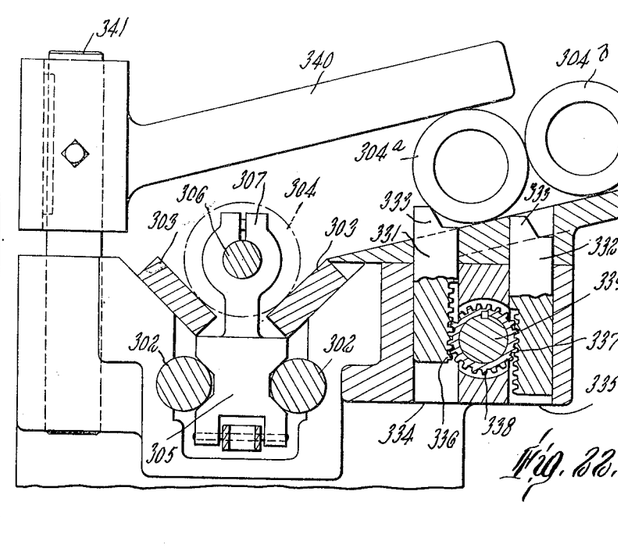

Stock may be supplied to a position in front of the stock feed carriage and may be arranged on an inclined bed 330 as shown in Figure 22, this inclined bed sloping downwardly to the trough formed by the members 303. The pieces of stock may be allowed to descend one at a time into feeding position by means shown in Figure 22, which comprise a pair of stop posts 331 and 332 having shoulder portions 333 for engagement with the stock. As shown these posts are mounted for vertical sliding movement in a pair of ways 334 and 335 and their confronting faces may be formed of rack portions 336 and 337 which mesh with a gear 338 carried by a rock shaft 339 positioned between the stop posts. By rocking the shaft 339, one or the other of these posts may be projected above the top face of the membr 330 while the other is being lowered therebeneath. Thus in the position shown in Figure 22, by lowering the left hand post 331, the work piece 304a will be released so that it may roll down into the feeding trough, while the post 332 will be projected up into the path of motion of the work piece 304b next above, which will prevent this work piece and any above it from descending further toward feeding position. On reverse rocking of the shaft 339, the left hand post will be lifted and the right hand post 332 depressed, allowing the work piece 304b to pass down until stopped by the post 331 in the position occupied in Figure 22 by the work piece 304a. An arm 340 adjustably carried on a post 341 projecting upwardly from the adjacent standard acts to retain the work pieces against the top face of the bed 330 so that they cannot pass the post 331 when it is in elevated position.

The shaft 339 extends from the standard 301 through the standard 300 and out toward the outer end of the bracket 312 and is provided at its ends with spiral gears 345 with which mesh spiral gears 346 on a pair of rock shafts 347. These rock shafts are provided with fingers 348 in position to be engaged by the work piece and by the carriage 305 when it approaches the limits of its motions. As the feed carriage 305 approaches its outer limit of motion, the shaft 347 is rocked to the position shown in Figure 23, which acts to rotate the gear 338 in direction to permit the foremost piece of stock on the supply member 330 to be released so that it rolls into position to be engaged and fed forwardly by the feed plunger 3060. When the bar of stock strikes the inner finger 348 of the inner shaft 347, the gear 338 is rocked in the reverse direction, returning the stop fingers 331 and 332 to the position shown in Figure 22, allowing the next succeeding piece of stock to move into position for release to feeding position when the stock feeding means has next been returned to fully retracted position. A switch LS9 at the entrance end of the spindle and carried by the stand 301 is in position to be engaged by a pin 351 projecting from the feed carriage 305 which acts to deenergize the main motor M to stop the machine as will later more fully appear.

*Stock stop*

Rockably carried on the forward face of the column 2 is an arm 375 carrying a stock stop 376 at its outer end. This stop is adapted to be adjusted on the arm 375 from and toward the forward face of the column and when the arm 375 is in its inoperative position shown in Figure 1 and in full lines in Figure 25, it is positioned opposite to a fixed abutment 377. This abutment is arranged accurately in line with the rear edge of the cut-off tool carried by one of the side tool carriers, and herein shown as the central carrier 71, so that when the stock stop 376 is adjusted at a predetermined accurate distance therefrom, as by means of measuring blocks placed therebetween, it will be correctly positioned to measure off the desired length of stock projecting from the work spindle when it is turned into its upper position shown in dotted lines in Figure 25 with its stop portion 376 in line with the work spindle. When the work is to be fed, therefore, the stock stop is arranged to be swung upwardly into operative position and the stock is fed until it strikes against the stop, after which the stock is clamped in the spindle and the stop is returned to its inoperative lowered position.

As shown in Figure 25 the movement of the stock stop is actuated hydraulically by a motor of the vane type shown at 380 having a gear 381 on its actuating shaft meshing with a pinion 382 on the pivot shaft 383 of the arm 375.

*Controlling mechanism and cycle of operation*

The machine controlling mechanism comprises the hydraulic system contained in a unit 400 which may be placed in a recess 401 in the base of the machine. This unit, as shown in the diagram of Figure 25, comprises a supply tank 402, and a high pressure low volume pump 403 driven by the motor HM which delivers liquid under pressure from the tank through the sequence valve 404 into the pressure line 405. Excess fluid from the line 405 is discharged through the line 404 into the line 406. A low pressure large volume pump 406 driven by the same motor HM also delivers liquid from the tank 402 past a check valve 407 into the pressure line 406. The pressure line 406 also communicates through a pressure relief valve 409 with a discharge pipe 410. Fluid under pressure from the line 406 and discharge to the pipe 410 for the several hydraulically actuated tool slides 70, 71, 72 and 204 and to the stock stop vane motor 380 are controlled by four-way valves actuated by electrically moved rack bars and pinions as will later more fully appear.

Figure 4:
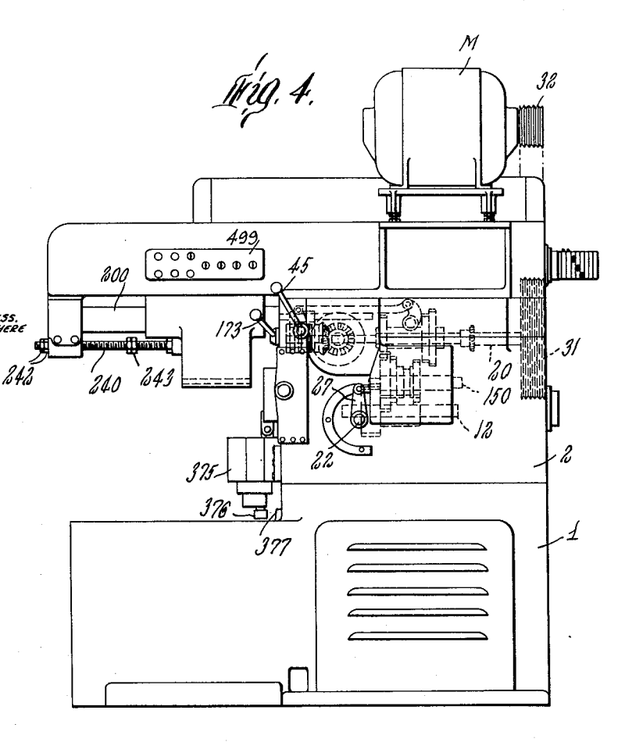
Figure 4 is a rear elevation of the same.
Figure 24:
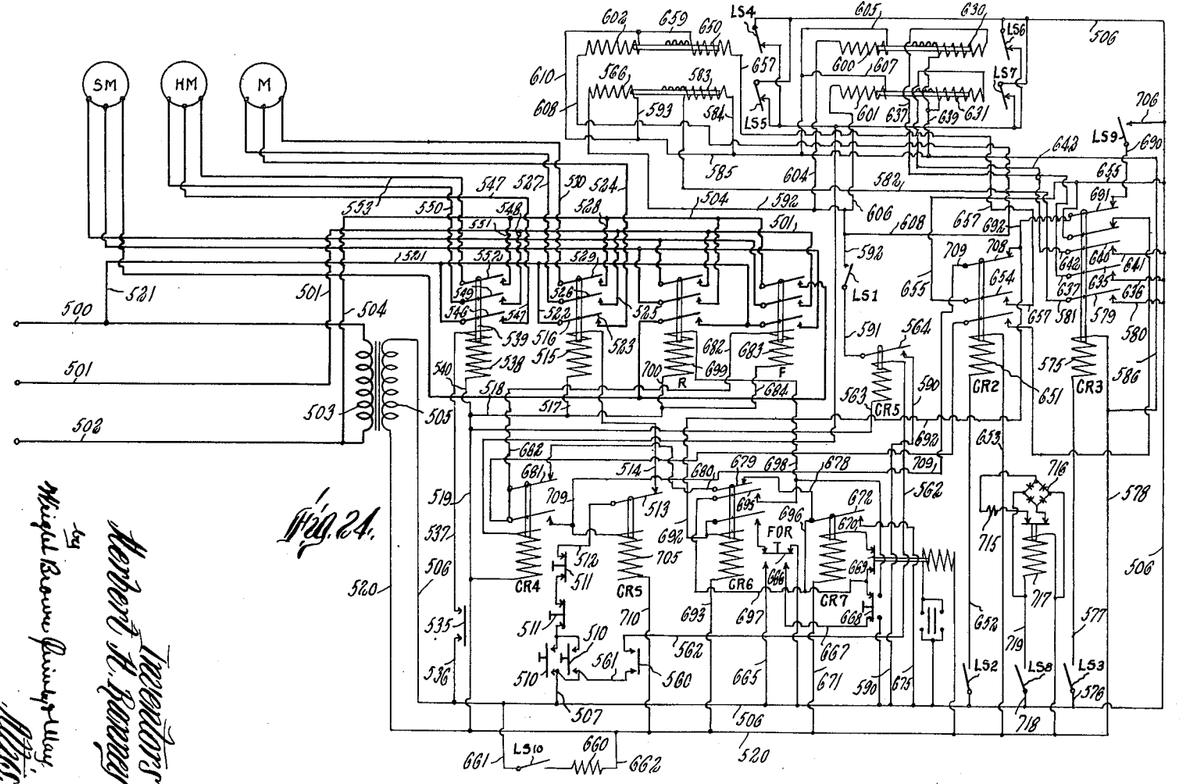
Figure 24 is a wiring diagram showing the electrical controls for the machine.

Simplified electrical controls for the machine are shown in Figure 24 in which the main motor M, the hydraulic pump driving motor HM, and the stock feed driving motor SM are shown as energized from the three-phase power lines 500, 501 and 502. Across the lines 500 and 502 is the primary 503 of a transformer, the secondary 505 of which provides low voltage current for the control circuits. A push button panel 499 is located on each of the front and back faces of the machine as shown in Figures 1 and 4, each panel including a start button 510 and a stop button 511. Jog switch buttons may also be included, but the circuits therefor and various safety circuits which may be used are not shown on Figure 24 as they do not form part of the present invention and to avoid further complicating the diagram of Figure 24. Each start button 510 when depressed closes a circuit for the transformer secondary 505 through leads 506, 507, the start button 510, the closed stop buttons 511, lead 512, closed switch 513 of relay CRS, lead 514, solenoid 515 of the main motor switch 516, leads 517, 518 and 519, back to the lead 520 from the transformer secondary 505. Energization of the solenoid 515 closes the switch which energizes the main motor M from the three phases; from line 500 through leads 521, 522, closed switch 523, and lead 524 to the motor M; from line 501 through lead 525, closed switch 526 and lead 527 to the motor M; and from line 502 through leads 504, 528, switch 529 and lead 530 to the motor M.

The hydraulic motor HM is started by closing the manual switch 535, which establishes a circuit from the lead 506 through leads 536, closed switch 535, lead 537, solenoid 538 of the hydraulic motor HM switch 539, lead 540 to the return lead 520. This switch 539 remains closed during the entire operation of the machine. Closing of the switch 539 connects all three phases of the power line to the hydraulic pump motor, from line 500 through leads 521, 545, closed switch arm 546 of the switch 539, and lead 547 to the motor HM; from line 501 through lead 548, closed switch arm 549 of the switch 539 and lead 550 to the motor HM; and from line 502 through leads 504 and 551, closed switch arm 552 of the switch 539 and lead 555 to the motor HM.

At the start of the cycle all of the tool carriers are retracted, and the switches LS4, LS5, LS6 and LS7 are each open. The switch 560 is closed by the operator, this energizing the solenoid of relay CR5 from the lead 506 through the leads 507 and 561, closed switch 560 and lead 562 to the solenoid of relay CR5 to leads 563 and 519 back to lead 520. Energizing of the relay CR5 closes its switch 564 which, however, does nothing until such time as the machine cam shaft reaches the angular position to close a switch LS1, which is when the low speed rotation of the cam shaft starts and which is actuated by a suitable cam dog carried by this shaft. Switches LS2 to LS7 and switch LS10 are also actuated by dogs carried by cam shaft 58 at suitable angular positions as shown in Figure 1a. Closing of both switches 564 and LS1 closes a circuit through solenoid 566 of the hydraulic valve 567 of Figure 25, which places this valve in the condition shown in Figure 25 with the inner end of the cylinder 72 in communication with the pipe 568 with a pressure pipe 408, while the rear end of the cylinder 72 is open to the discharge pipe 410 through the pipe 569 and the valve 567. The hydraulic valve 567 remains in this condition even though switch LS1 opens. The solenoid 566 which moves the valve to this position is energized from the lead 506 through leads 590, closed switch 564 of the relay CR5, lead 591, closed switch LS1, lead 592, solenoid 566, and leads 593, 585, 586 and 578 to the lead 520. The rear tool slide is thus moved inwardly until its cam roller 101 strikes the corresponding cam 102. Since there is little resistance to this motion of the tool slide, it is moved rapidly by the action of the high volume low pressure pump 406, but when its rapid motion is stopped, the pressure is increased by the action of the high pressure pump 403 which acts through the sequence valves 404 and 572 to increase the pressure with which the tool slide is moved inwardly. A check valve 571 prevents any reverse flow from the cylinder 72 and a sequence valve 572 admits fluid under high pressure when the rapid feed of the slide is stopped. The back tool slide 72 continues to move inwardly under high pressure and at the slow working speed controlled by the scope of its controlling cam 102 and the low speed rotation of the ring 105 which carries this cam. The limit of inward feed of this slide is determined by a positive stop 180 and when its roughing operation has been completed, the switch LS3 is closed by the cam shaft, the switch LS1 now being open. Closing of the switch LS3 closes a circuit through the solenoid 575 of the relay CR3 from the lead 506 through the lead 576, closed switch LS3, lead 577, coil 575 of the relay CR3, and lead 578 back to the lead 520. Closing of the relay CR3 closes several switches including switch 579, which acts to return the tool slide 72 to retracted position. Closing of the switch 579 establishes a circuit from lead 506 through the lead 580, closed switch 579 of the relay CR3, leads 581 and 582, retire solenoid 583 of the valve 567 and leads 584, 585, 586 and 578 to the lead 520. This reverses the hydraulic valve 567, connecting the pipe 569 to the pressure pipe 408 and connecting the pipe 568 to the discharge pipe 410. Since there is little resistance to the return motion of the slide, it returns at high speed produced by the action of the low pressure high volume pump 406.

The closing of both switches LS1 and 564 also starts the feed motion of the finish tool slide 70, the end working tool slide 203 and the cutting off slide 71, but the cutting actions of each of the slides 70 and 71 is controlled by the contour of its own cam 102, the finishing tool on the slide 70 following behind the roughing tool so that it does not come into action until the completion of the roughing cut. The closing of the switches LS1 and 564 energizes the solenoids 600 and 601 of the finishing and end working tool slides, respectively, and 602 for the cut-off slide 71. The solenoid 600 for the finishing tool slide is energized from the closed switch LS1 through leads 592 and 604, solenoid 600 and lead 605 to the lead 585. The solenoid 601 is energized from the switch LS1 through leads 592, 606, solenoid 601 and lead 607 and 605 to the lead 585. The solenoid 602 for the cut-off slide is energized from the switch LS1 through leads 592, 608, solenoid 602 and lead 610 to the lead 585. The solenoids 600, 601, and 602, when energized, move their respective hydraulic valves 615, 616, 617 into the position shown in Figure 25, connecting the pipes 618, 619 and 620 leading to the inner ends of their respective cylinders 70, 204 and 71 to the pressure pipe 408, and pipes 621, 622 and 623, respectively, leading to the opposite ends of the cylinders, to discharge. Sequence and check valves 624 and 625 are arranged in these lines similar to the corresponding valves in the roughing tool control system previously described. The finished tool slide and the end working tool slide are returned by energization of hydraulic valve controlling solenoids 630 and 631 and are controlled by the return control for the roughing cut by the closing of the relay CR3.

These controls are as follows. Closing of the relay CR3 closes a switch 635 which energizes the solenoid 630 from lead 506 through lead 636, closed switch 635 of relay CR3, lead 637, solenoid 630 and leads 639, 585, 586 and 578 to the lead 520. Closing of this relay CR3 also closes a switch 640 which energizes solenoid 631 from the lead 506 through leads 641, closed switch 640 of the relay CR3, lead 642, solenoid 631 and leads 639, 585, 586 and 578 to lead 520.

The cut-off tool slide 71 is returned by the closing of the switch LS2 which is actuated by a suitable dog on the cam shaft 58. Closing of this switch LS2 energizes the solenoid 650 of the cut-off tool slide control valve which reverses the valve 617, connecting the pipe 623 to pressure and the pipe 620 to discharge. Closing of the switch LS2 energizes the coil 651 of the relay CR2 from the lead 506 through closed switch LS2, lead 652, coil 651 of the relay CR2 and lead 653 to the lead 520. Closing of the relay CR2 closes a switch 654 which energizes the reverse hydraulic solenoid 650. This circuit is from the leads 506 through lead 655, closed switch 654 of the relay CR2, lead 657, solenoid 650 and leads 659, 610, 586 and 578 back to the lead 520.

After the tools have done their work and have retracted, the cam shaft reaches an angular position at which cams (not shown) on the drum 181 close the high speed clutch 36 so that the cam shaft is now driven at its high speed from the shaft 20, and when this has been accomplished, the chuck is opened mechanically by cams on the cam drum 57 which swings the lever 50 in counterclockwise direction as viewed in Figure 1. The stock stop 376 is then swung up into operative position by the closing of a switch LS10 which is positioned adjacent to the cam shaft and is actuated by a suitable dog thereon, as previously described. Closing of this switch LS10 energizes the stop lifting solenoid 660 (Figures 24 and 25) by closing a circuit from the lead 506 through the lead 661, closed switch LS10, solenoid 660, and lead 662 back to the lead 520. The switch LS10 is held closed until after the feed of the stock has occurred, and it is then allowed to open so that the stock stop may be returned to inoperative lowered position shown in Figure 1. A spring 664 engaging the rack bar 665 returns the valve 663 to its inoperative position shown in Figure 25.

*Stock feed*

The stock feed is produced by forward motion of the stock feed motor SM which is effected by the operator, who closes the manual switch FOR. This closes a circuit from lead 506 through lead 666, closed switch FOR, lead 667, closed switch 668, closed manual reverse time delay switch 669, lead 670, solenoid of relay CR7 and lead 671 back to the lead 520. Closing of the relay CR7 closes a switch 672 which closes the controlling switch to the stock feed motor SM from the lead 506 through leads 675, closed switch 672 of the relay CR7, lead 678, closed switch 679 of relay CR6, lead 680, closed switch 681 of relay CR4, lead 682 to the coil 683 of the forward switch F of the stock feed motor, leads 684, 518, and 519 to the lead 520. The feed motor SM continues to work until the stock strikes the stock stop, whereupon the slip clutch in the unit 320 in the motor drive slips until the chuck opens and the stock is again fed forward to the stock stop and so repeats. Meanwhile the switch LS3 has been closed by a dog on the cam shaft 58 which conditions the circuit by energizing the coil 575 of the relay CR3 which closes the switch 691 and opens the switch 1691 so that when a limit switch LS9 is contacted by the feed carriage when the feed has progressed to its forward limit, the machine will be stopped, and the stock feed motor SM reversed to retract the feed carriage automatically, and after a predetermined time the motor SM is stopped by the time delay switch 669. This action acts as a signal to the operator and allows the operator to remove short ends of stock from the spindle, and re-stock the carriage with new bars after which he may start the machine again by pressing either of the start buttons. Pressing a forward feed button starts the motor SM and causes a new bar of stock to contact any remaining stock left in the spindle, pushing it against the stock stop, the slip clutch then again coming into action.

Reversing of the feed motor is effected as follows. The switches LS3 and LS9 being closed, a circuit is closed from the lead 506 through closed switch LS9, leads 690, closed switch 691 of the relay CR3, lead 692, coil of the relay CR6 and leads 693 to the lead 520. Closing of the relay CR6 opens the switch 679 in the circuit which closed the forward feed motor switch, thus causing the forward switch F to open. Closing of the relay CR6 also closes a switch 695 which acts to throw in the reverse direction return switch R for the stock feed motor SM as follows. Circuit is made from the lead 506 through lead 675, closed switch 672 of the relay CR7, leads 696 and 697, closed switch 695 of relay CR6, lead 698, coil 699 of the relay R, leads 700, 518 and 519 to the lead 520. Closing of the relay R causes the feed motor to operate in the reverse direction, its switch reversing the connections of the motor to the lines 501 and 502. The automatic stopping of the machine motor M is effected as follows. When the switch LS3 at the drum shaft was closed, the relay CR3 was energized and the normally open switch LS9 was closed by the feed carriage, this, in turn, energizing the relay CR6. When the switch LS3 is allowed to open by its cam, it deenergizes the relay CR3 which closes a circuit from the lead 506 through the lead 720, normally closed forward contacts 666, through lead 621, closed switch 722 of the relay CR6, lead 692, closed switch 1691, lead 726, switch 708 of relay CR3, lead 724, switch 708 of the relay CR2, to the coil 705 of relay CR5, through lead 710 to lead 520. Energizing the coil 705 of the relay CR5 holds the switch 513 open, which closes down the main motor M.

Certain unnumbered switches and leads shown in the diagram are portions of so called safety circuits, but as they are not material to this invention, they are not described herein.

When during the cycle the cam shaft 58 opens the high speed clutch at 36, allowing the low speed drive to take over, the rotation of the worm shaft 60 is slowed to the rate of the low speed drive by the brake 66, as heretofore described. This brake is electrically actuated by the energizing of the solenoid 715 through a rectifier 716 across the time delay 717 interposed in a circuit from the lead 506 through leads 718 and 719, and switch LS8 which is closed by lever 169 when it opens the clutch 36. The brake remains on for a time, controlled by the setting of the time delay 717 in each cycle of operation of the machine.

From the foregoing description of an embodiment of this invention, it will be evident to those skilled in the art that various changes and modifications may be made without departing from its spirit or scope.

I claim:

1. In combination with a rotary spindle, a work holder carried by said spindle, a cam ring journaled on said spindle, means for rotating said cam ring at a slower rate than said spindle, a tool carrier movable toward and from said spindle, a tool carried by said carrier for operation on work carried by said work holder, a follower on said carrier, a cam on said ring and against which said follower may ride, power means for pressing said carrier toward the work and with its follower riding on said cam and for retracting said carrier, and means controlling said power means.

2. In combination with a rotary spindle, a work holder carried by said spindle, a cam ring journaled on said spindle, means for rotating said cam ring at a slower rate than said spindle, a tool carrier movable toward and from said spindle, a tool carried by said carrier for operation on work carried by said work holder, a follower on said carrier, a cam on said ring and against which said follower may ride, fluid pressure means for pressing said carrier with its follower riding on said cam to press said tool against the work and for retracting said carrier, and means controlling said fluid pressure means to advance and retract said carrier and its tool with respect to the work.

3. In combination with a rotary spindle, a work holder carried by said spindle, a cam ring journaled on said spindle, means for rotating said cam ring at a slower rate than the rotation of said spindle, a plurality of tool carriers arranged angularly spaced around the axis of said spindle, each carrier being mounted for motion toward and from work carried by said work holder, a cam follower on each of said carriers, a cam for each of said followers carried by said ring, power means for pressing said carriers toward said work holder as far as permitted by said follower riding on said cams and for retracting said carriers, and means for controlling said power means.

4. In combination with a rotary spindle, a work holder carried by said spindle, a cam ring journaled on said spindle, means for rotating said cam ring at a slower rate than the rotation of said spindle, a plurality of tool carriers arranged angularly spaced around the axis of said spindle, each carrier being mounted for motion toward and from work carried by said work holder, a cam follower on each of said carriers, a cam for each of said followers carried by said ring, power means for pressing said carirers toward said work holder as far as permitted by said followers riding on said cams and for retracting said carriers, a rotary shaft, means for rotating said shaft in time with the rotation of said spindle, dogs carried by said shaft, and controlling means for each of said power means arranged in the path of motion of their respective dogs for actuation by said dogs in time with the angular positions of said shaft.

5. In combination, a hollow rotatable work spindle through which a work piece may extend, a tool holder having tools including a cut-off tool for operating on work projecting from one end of said spindle, a machine bed carrying said spindle and supporting said tool holder, an abutment carried by said bed in definite relation to the inner edge of said cutting off tool, and a stock stop carried by said bed and movable between a position in line with said spindle to limit the feed of stock through said spindle and a position opposite to said abutment, said stock stop having a stopping portion adjustable in a direction substantially parallel to the axis of said spindle, said abutment serving when said stop portion is opposite thereto as a reference from which measured adjustment of the spacing of said stopping element may be made to thereby determine the length of stock feed after cut-off has been effected.

6. In combination with a rotary work holding spindle, a tool carrier mounted for motion toward and from work held by said spindle, a cam mounted for motion concentric with said spindle, a follower for said cam carried by said tool carrier, power means for moving said carrier toward and from said spindle and said follower toward and from said cam, the engagement of said follower on said cam limiting the depth of cut of a tool on said carrier with respect to work held by said spindle, means for controlling said power means, means for rotating said spindle, and means for turning said cam at a different rate from said spindle while said follower is in engagement with said cam whereby the contour of said cam controls the rate of feed of said tool by said power means as said cam is turned.

7. In combination with a rotary work holding spindle, a tool carrier mounted for motion toward and from work held by said spindle, a cam ring journaled coaxially with said spindle, a cam carried by said ring, a follower for said cam carried by said tool carrier, power means for moving said carrier toward and from said spindle and said follower toward and from said cam, the engagement of said follower on said cam limiting the depth of cut of a tool on said carrier with respect to work held by said spindle, means for controlling said power means, means for rotating said spindle, and means for turning said ring at a different rate from said spindle while said follower is in engagement with said cam whereby the contour of said cam controls the rate of feed of said tool by said power means as said ring is turned.

References Cited in the file of this patent

UNITED STATES PATENTS

| Number | Name | Date |
|---|---|---|
| 120,593 | Miller | Nov. 7, 1871 |
| 627,335 | Brockie | June 20, 1899 |
| 1,467,304 | Bosshard | Sept. 11, 1923 |
| 1,635,285 | Lovely | July 12, 1927 |
| 1,762,988 | Hogg | June 10, 1930 |
| 1,954,964 | Tessky | Apr. 17, 1934 |
| 1,956,999 | Rupple | May 1, 1934 |
| 2,029,638 | Ruppel | Feb. 9, 1936 |
| 2,092,202 | Bennett | Sept. 7, 1937 |
| 2,255,170 | Kelley | Sept. 9, 1941 |
| 2,257,729 | Bosworth | Oct. 7, 1941 |
| 2,369,466 | Kylin et al. | Feb. 13, 1945 |
| 2,425,308 | Drissner | Aug. 12, 1947 |
| 2,441,533 | Montgomery | May 11, 1948 |
| 2,480,319 | Brodhun | Aug. 30, 1949 |